US006454078B1

(12) United States Patent
Behle et al.

(10) Patent No.: US 6,454,078 B1

(45) Date of Patent: Sep. 24, 2002

(54) COMB PROFILE FOR COMB SUPPORTS OF ESCALATORS AND MOVING WALKWAYS

(75) Inventors: Fritz Behle, Sprockhoevel; Wolfgang Bauch, Dortmund, both of (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/949,507

(22) Filed: Sep. 6, 2001

Related U.S. Application Data

(63) Continuation of application No. PCT/EP00/01856, filed on Mar. 3, 2000.

(30) Foreign Application Priority Data

Mar. 6, 1999 (DE) ........................................ 199 09 952

(51) Int. Cl.$^{7}$ ................................................ B65G 15/00

(52) U.S. Cl. ....................................................... 198/325

(58) Field of Search ................................ 198/325, 323, 198/224, 635

(56) References Cited

U.S. PATENT DOCUMENTS 3,687,257 A 8/1972 Johnson 6,138,819 A * 10/2000 Bogle et al. ................ 198/325

FOREIGN PATENT DOCUMENTS

JP 405097374 A * 4/1993 ................. 198/325

* cited by examiner

*Primary Examiner*—Kenneth W. Noland

(74) *Attorney, Agent, or Firm*—Venable; Robert Kinberg

(57) ABSTRACT

The invention relates to a profile for comb supports of escalators and moving walkways comprising a plurality of segments for being connected to a comb support, the segments having respective front faces juxtaposed to one another, wherein the front face of a first segment of the plurality of segments comprises a nose shaped projection and the front face of a second segment of the plurality of segments comprises a groove for receiving said projection of the first segment, forming a tongue and groove arrangement for releasably interlinking the segments outside of the comb support.

1 Claim, 3 Drawing Sheets

COMB PROFILE FOR COMB SUPPORTS OF ESCALATORS AND MOVING WALKWAYS

CROSS REFERENCE TO RELATED APPLICATION

This application is a continuation of PCT/EP00/0/856, filed Mar. 3, 2000.

BACKGROUND OF THE INVENTION

The invention relates to a comb profile for comb supports of escalators and moving walkways.

It is the general state of the art that the individual comb segments of comb supports of escalators and moving walkways can be made of very different materials, such as, e.g., aluminum, plastics or the like, and are connected in the region of one of their ends to the comb support, in particular by screwing. The portion remaining outside the comb support penetrates into the steps and pallets of the escalator and moving walkways on the comb side, the segments being flush joined in the area of their front faces facing each other.

Regarding the fact, that, inter alia, also caddies, carts, trolleys or the like are moved respectively transported on moving walkways and frequently also on escalators, it is necessary to design the comb profiles such that a flat angle of inclination is formed. This causes a material reduction, which in turn causes problems if bigger loads act on the single segments of the comb profile. The flush joined combs can be individually deformed, as soon as point loads act thereon. Excessive, not admissible deflections of the combs as well as material breaks or materials fatigues cannot be excluded herein, so that a relatively fast replacement of single segments is required, which in turn causes an undesired standstill of the escalator or the moving walkway.

From U.S. Pat. No. 3,687,257 a comb support for passenger transport installations is known, which is composed of several juxtaposed segments. A round rod releasably connects the segments provided with smooth front faces as well as through bores to each other. By means of this measure a connection of all segments can be realised, but the replacement of individual, eventually damaged segments is not possible without disconnecting them.

Due to process tolerances it can also happen, that single ones of the segments are provided projecting respectively standing back in connection, which causes a negative optical impression.

SUMMARY OF THE INVENTION

It is the object of the invention to improve the comb profile for comb supports of escalators and moving walkways, such that desirable flat angles of inclination of the segments can be fulfilled and damage to the individual segments can be largely avoided. Furthermore, it shall also be possible to replace single segments in case of damages without requiring the dismounting of the whole compound.

This object is solved with a profile for comb supports of escalators and moving walkways comprising a plurality of segments for being connected to a comb support, the segments having respective front faces juxtaposed to one another, wherein the front face of a first segment of said plurality of segments comprises a nose shaped projection and the front face of a second segment of said plurality of segments comprises a groove for receiving said projection of the first segment, forming a tongue and groove arrangement for releasably interlinking the segments outside of the comb support. Advantageous embodiments and useful modifications of the will become apparent from the disclosure herein.

Due to this second junction point a relatively rigid overall construction of the comb profile consisting of several individual segments is formed. By means of this measure it is possible to realize the material reduction with simultaneous formation of flatwise-inclined segments. Point loads no longer act directly on single segments, but act indirectly on the whole comb profile, whereby it is also possible to largely avoid damages of the individual segments. The deflection of single combs is substantially reduced, which also has a positive effect on the material fatigue.

There are different technical designs for establishing the releasable connection in the comb side area of the individual segments, wherein a tongue and groove joint shall be preferably used. Alternatives such as pin connections or the like are also imaginable.

The preferred tongue and groove joint is designed such that single segments can be extracted after disconnecting them from the comb support, so that eventually damaged segments can also be replaced without requiring the at least partial dismounting of the steps or pallets of the escalator respectively the moving walkway.

BRIEF DESCRIPTION OF THE DRAWINGS

The object of the invention is represented in the drawing by means of an example of realisation and is described as follows.

DETAILED DESCRIPTION OF THE INVENTION

Figure 1:
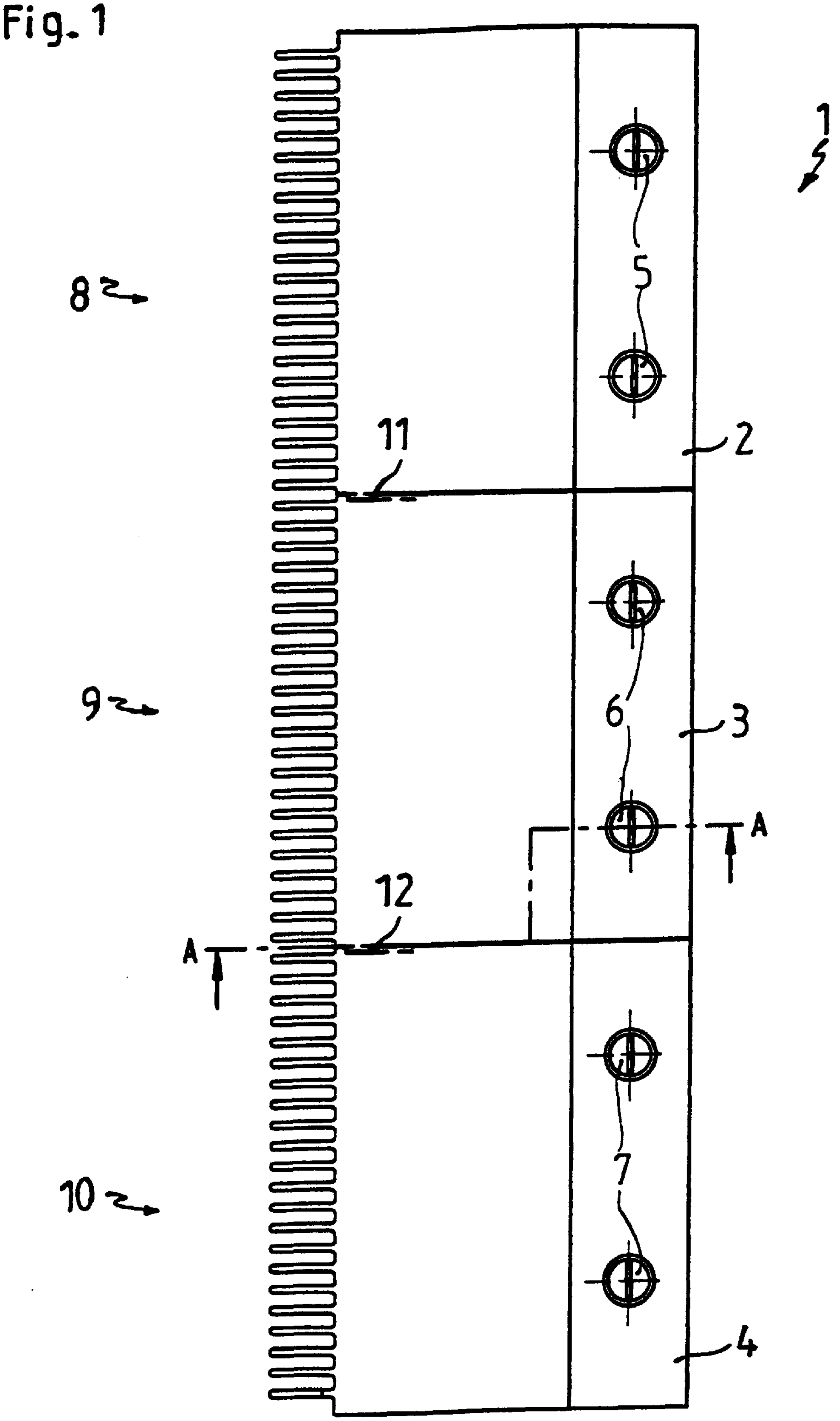
FIG. 1 shows a comb profile composed of several single segments.

FIG. 1 shows a comb profile 1 composed of several single segments 2, 3, 4, wherein the segments 2 and 4 form external segments of the comb profile 1 whereas the segment 3 is one of, should the occasion arise, several internal segments.

The single segments 2, 3, 4 are connected to a comb support, which is no further represented herein, by means of screws 5, 6, 7. Each segment 2, 3, 4 is provided with a comb like profile 8, 9, 10 outside the screw connection 5, 6, 7. In the area of this comb like profile 8, 9, 10 there are only outlined releasable connections 11, 12 given between the segments 2 and 3 on the one hand and between the segments 3 and 4 on the other hand.

Figure 2:
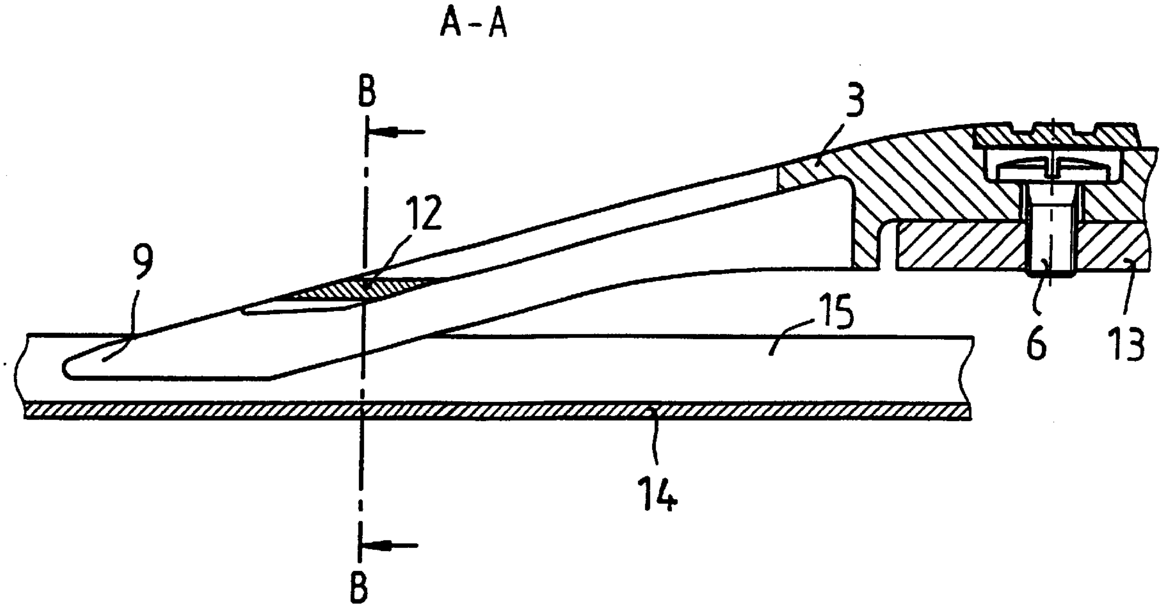
FIG. 2 is a section through FIG. 1 along line A—A.

FIG. 2 shows a transverse section through segment 3 according to line A—A of FIG. 1. The following components can be seen: segment 3, only outlined comb supports 13, screw 6 as well as an outlined step 14 of a no further represented escalator. Step 14 is provided with a tread profile 15, in which the comb profile 9 of segment 3 engages. The releasable connection 12 is pointed out by hatching in this figure.

Figure 3:
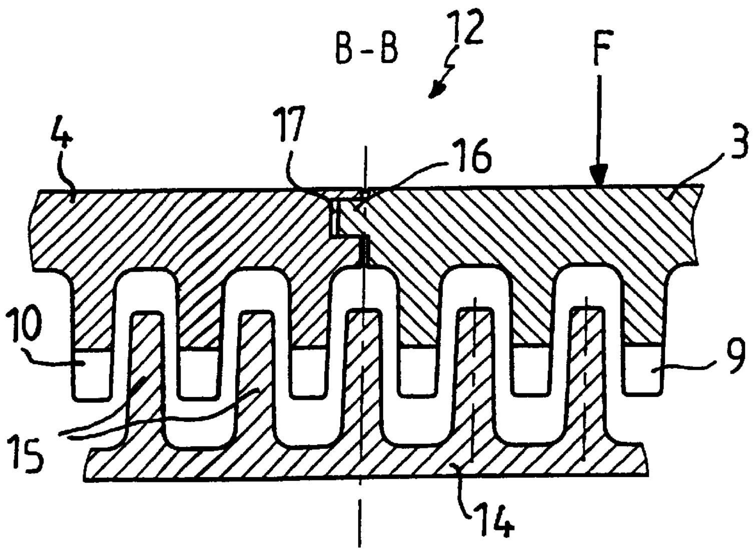
FIG. 3 is a section through FIG. 2 along line B—B.

FIG. 3 shows a section according to line B—B of FIG. 2. One can see segments 3 and 4 and step 14 including profile 15, wherein comb profiles 9, 10 of segments 3, 4 engage in the corresponding tread profiles 15 of step 14. FIG. 3 now shows the releasable connection between the segments 3 and 4, which is composed in this example of a so-called tongue and groove joint. In the area of its front face turned towards segment 4, segment 3 is provided with a nose shaped projection 16 engaging in a groove 17 provided in segment 4. Forces, which are eventually exerted on segment 3, thus do not remain in segment 3, but are proportionally transferred to the adjacent segments 2 and 4, whereby the deflection of the single segment 3 is reduced or even completely avoided.

Figure 4:
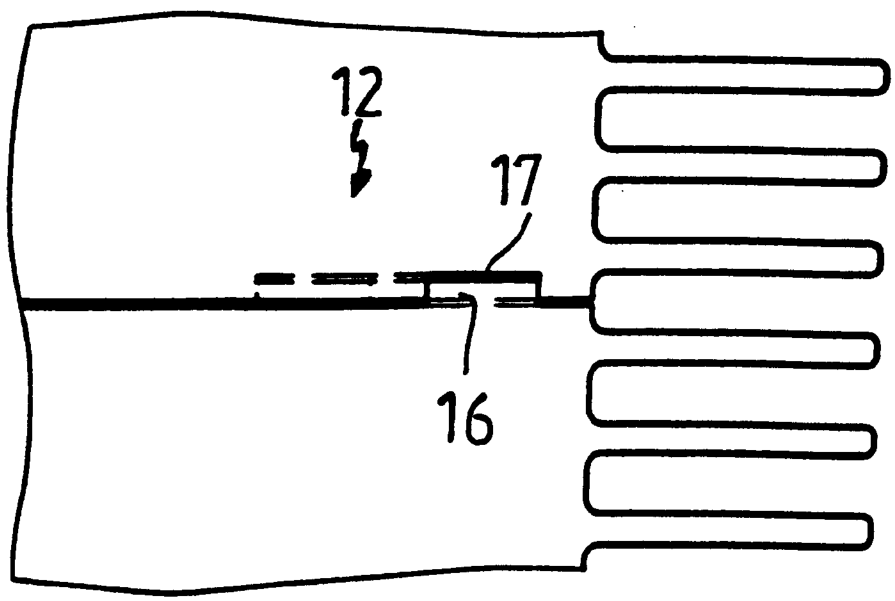
FIG. 4 is an enlarged representation of the connection area on the comb side.

FIG. 4 shows an enlarged representation of the connection area 12 according to FIG. 1, wherein also the nose shaped projection 16 can be seen, which engages into the corresponding groove 17.

What is claimed is:

1. A profile for comb supports of escalators and moving walkways comprising:

a plurality of segments for being connected to a comb support, the segments having respective front faces juxtaposed to one another, wherein the front face of a first segment of said plurality of segments comprises a nose shaped projection and the front face of a second segment of said plurality of segments comprises a groove for receiving said projection of the first segment, forming a tongue and groove arrangement for releasably interlinking the segments outside of the comb support.

* * * * *